(12) United States Patent
Kleman

(10) Patent No.: US 8,497,799 B2
(45) Date of Patent: Jul. 30, 2013

(54) FMCW-TYPE RADAR LEVEL GAUGE

(75) Inventor: Mikael Kleman, Vreta Kloster (SE)

(73) Assignee: Rosemount Tank Radar AB, Gothenburg (SE)

( * ) Notice: Subject to any disclaimer, the term of this patent is extended or adjusted under 35 U.S.C. 154(b) by 148 days.

(21) Appl. No.: 13/114,412

(22) Filed: May 24, 2011

(65) Prior Publication Data

US 2012/0299767 A1 Nov. 29, 2012

(51) Int. Cl.
*G01S 13/08* (2006.01)

(52) U.S. Cl.
USPC ............ 342/124; 342/118; 342/128; 342/129

(58) Field of Classification Search
USPC .................................. 342/124, 128, 129, 118
See application file for complete search history.

(56) References Cited

U.S. PATENT DOCUMENTS

| | | | |
|---|---|---|---|
| 5,406,842 A * | 4/1995 | Locke | 73/290 R |
| 5,440,310 A * | 8/1995 | Schreiner | 342/124 |
| 6,414,625 B1 * | 7/2002 | Kleman | 342/124 |
| 6,486,826 B1 * | 11/2002 | Cramer et al. | 342/124 |
| 6,765,524 B2 * | 7/2004 | Kleman | 342/124 |
| 7,053,630 B2 * | 5/2006 | Westerling et al. | 324/644 |
| 7,532,155 B2 * | 5/2009 | Kleman et al. | 342/124 |
| 7,586,435 B1 * | 9/2009 | Edvardsson | 342/124 |
| 7,589,664 B2 * | 9/2009 | Jirskog | 342/124 |
| 8,319,680 B2 * | 11/2012 | Sai | 342/124 |
| 2002/0020216 A1 * | 2/2002 | Schultheiss | 73/290 V |
| 2002/0101373 A1 * | 8/2002 | Arndt et al. | 342/124 |
| 2004/0080324 A1 * | 4/2004 | Westerling et al. | 324/644 |
| 2005/0168379 A1 * | 8/2005 | Griessbaum et al. | 342/124 |

(Continued)

FOREIGN PATENT DOCUMENTS

| WO | WO 2004/005960 | | 1/2004 |
|---|---|---|---|
| WO | WO 2004005960 A1 | * | 1/2004 |
| WO | WO 2007/014333 | | 2/2007 |
| WO | WO 2007/111498 | | 10/2007 |

OTHER PUBLICATIONS

International Search Report for PCT Application No. PCT/EP2011/066585, dated Nov. 25, 2011, 4 pgs.

(Continued)

*Primary Examiner* — Jack W Keith
*Assistant Examiner* — Peter Bythrow
(74) *Attorney, Agent, or Firm* — Westman, Champlin & Kelly, P.A.

(57) ABSTRACT

A level gauge using microwaves to determine a distance to a surface of a product in a tank, wherein a measurement signal comprises a first frequency sweep, and a second frequency sweep, and a mixer is arranged to mix the measurement signal with an echo signal to form a first IF signal based on the first frequency sweep, and a second IF signal based on the second frequency sweep. Processing circuitry is adapted to sample the first IF signal and the second IF signal, to form a combined sample vector including samples from each tank signal, and to determine the distance based on the combined sample vector.

By combining the samples from two (or more) different sweeps, the number of samples and the bandwidth can both be increased, thus maintaining the range L. However, as the samples are obtained from two separate sweeps, the sweep time for each individual sweep does not need to be increased, and the average power consumption can be maintained.

22 Claims, 4 Drawing Sheets

U.S. PATENT DOCUMENTS

| | | | |
|---|---|---|---|
| 2006/0012512 A1* | 1/2006 | Jirskog | 342/124 |
| 2007/0236385 A1* | 10/2007 | Kleman et al. | 342/124 |
| 2009/0256737 A1* | 10/2009 | Ohlsson | 342/124 |
| 2009/0262006 A1* | 10/2009 | McNeill et al. | 342/22 |
| 2009/0315758 A1* | 12/2009 | Jirskog | 342/124 |
| 2010/0231437 A1* | 9/2010 | Szajnowski | 342/118 |
| 2011/0163910 A1* | 7/2011 | Sai | 342/124 |
| 2012/0169528 A1* | 7/2012 | Edvardsson et al. | 342/124 |

OTHER PUBLICATIONS

International Written Opinion for PCT Application No. PCT/EP2011/066585, dated Nov. 25, 2011, 6 pgs.

"Advanced High Precision Radar Gauge for Industrial Applications," Sai et al., RADAR, 2006, CIE '06. International Conference on, IEEE, PI, vol. 1, Oct. 16, 2006, pp. 463-466.

* cited by examiner

FMCW-TYPE RADAR LEVEL GAUGE

FIELD OF THE INVENTION

The present invention relates to a level gauge and a level gauging method using electromagnetic waves to determine a distance to a surface of a product in a tank.

BACKGROUND OF THE INVENTION

Since the radar level gauging was developed as a commercial product in the 1970's and 1980's, frequency modulated continuous wave (FMCW) has been the dominating measuring principle for high accuracy applications. An FMCW measurement comprises transmitting into the tank a signal which is swept over a frequency range in the order of a few GHz. For example, the signal can be in the range 25-27 GHz, or 9-10.5 GHz. The transmitted signal is reflected by the surface of the contents in the tank (or by any other impedance transition) and an echo signal, which has been delayed a certain time, is returned to the gauge. The echo signal is mixed with the transmitted signal to generate a mixer signal, having a frequency equal to the frequency change of the transmitted signal that has taken place during the time delay. If a linear sweep is used, this difference frequency, also referred to as an intermediate frequency (IF), is proportional to the distance to the reflecting surface. The mixer signal is often referred to as an IF signal.

More recently, the FMCW principle has been improved, and today typically involves transmitting not a continuous sweep but a signal with stepped frequency with practically constant amplitude. When the transmitted and received signals are mixed, each frequency step will provide one constant piece of a piecewise constant IF signal, thus providing one "sample" of the IF signal. In order to determine the frequency of the piecewise constant IF signal, a number of frequencies, N, greater than a number stipulated by the sampling theorem will be required. The distance to the reflecting surface is then determined using the frequency of the IF signal in a similar way as in a conventional FMCW system. Typical values can be 200-300 IF periods at 30 m distance divided in 1000-1500 steps.

It is noted that also a continuous IF signal, resulting from a continuous frequency sweep, may be sampled in order to allow digital processing.

Although highly accurate, conventional FMCW systems (continuous as well as stepped) are relatively power hungry, making them less suitable for applications where power is limited. Examples of such applications include field devices powered by a two-wire interface, such as a 4-20 mA loop, and wireless devices powered by an internal power source (e.g. a battery or a solar cell).

The main power consumer is the microwave module, which, due to the requirements on frequency accuracy, requires relatively high power to generate and emit the microwave energy during each sweep. Between sweeps suitable means can be used to store power, so that a lower average power can used to power the microwave module for the duration of the sweep. However, due to space limitations and intrinsic safety (IS) requirements, such power storage capacity is severely limited. Therefore, it is crucial to limit the active period of the microwave module, i.e. to limit the duration of the sweep. Further, it is necessary to limit the sampling rate, in order to reduce the power consumption in the analogue signal processing and the A/D conversion. Finally, from a performance point of view, it is advantageous to have a wide bandwidth, providing a high resolution (i.e. high accuracy).

For any sampled FMCW system (continuous sweep or stepped), the maximum measuring distance (range), L, is determined as $L=Nc/4B$, where N is the number of samples, c is the speed of light, and B is the sweep bandwidth. In case of a stepped frequency sweep, N will typically correspond to the number of different frequencies used. The sweep time, T, is $T=N/fs$, where fs is the sampling rate of the A/D conversion. In case of a stepped frequency sweep, fs will typically also be the stepping rate of the sweep.

From these simple relationships, it is clear that an increased bandwidth B will lead to a reduced range L unless the number of samples N is increased. However, as the sampling frequency is fixed at a reasonable value from an A/D conversion standpoint, any increase of the number of samples will inevitably lead to an increased sweep time.

For a given range, there is thus a tradeoff between accuracy (bandwidth) on one side, and power consumption (sweep time) on the other. This trade-off is present in any sampled FMCW system, in cases with a continuous sweep as well as with a stepped frequency sweep.

GENERAL DISCLOSURE OF THE INVENTION

It is an object of the present invention to address the above mentioned tradeoff, and provide a way to increase the bandwidth without increasing the sweep time for a given detection range.

According to an aspect of the present invention, this object is achieved by a level gauge using microwaves to determine the distance to a surface of a product in a tank, comprising a microwave source arranged to generate a measurement signal comprising a first frequency sweep and a second frequency sweep, a signal propagation device connected to the microwave source and adapted to emit the measurement signal into the tank, and to receive an echo signal reflected from the surface, a power store to power the microwave source, the power store being charged between sweeps, a mixer connected to the microwave source and the signal propagation device, and arranged to mix the measurement signal with the echo signal to form a first IF signal based on the first frequency sweep, and a second IF signal based on the second frequency sweep, sampling circuitry, connected to receive the tank signals from the mixer and adapted to sample the first IF signal and the second IF signal and to form a combined sample vector including samples from each tank signal, and processing circuitry connected to the sampling circuitry and adapted to determine the distance based on the combined sample vector.

According to another aspect of the present invention, this object is achieved by a method for determining a distance to a surface of a product in a tank, comprising the steps of generating a measurement signal, comprising a first frequency sweep and a second frequency sweep, emitting the measurement signal into the tank, receiving an echo signal reflected from the surface, mixing the measurement signal with the echo signal to form a first IF signal based on the first frequency sweep, and a second IF signal based on the second frequency sweep, sampling the first IF signal and the second IF signal, forming a combined sample vector including samples from the first and second tank signals, and determining the distance based on the combined sample vector.

By combining the samples from two (or more) different sweeps, the number of samples and the bandwidth can both be increased, thus maintaining the range L. However, as the samples are obtained from two separate sweeps, the sweep time for each individual sweep does not need to be increased, and the average power consumption can be maintained.

Expressed differently, a greater bandwidth for a given range and sampling frequency can be obtained without requiring a longer sweep time, by combining two (or more) consecutive sweeps. A single measurement cycle is thus spread out during two (or more) sweep times, and the power consumption can thus be maintained at a low level.

Of course, if considered advantageous, the measurement cycle can be divided between even more individual sweeps, such as three or more sweeps. However, there is a trade-off between increased bandwidth and prolonging the measurement cycle. A longer measurement cycle requires a more stable measurement situation, and may become more susceptible to turbulence and noise.

The invention may advantageously be used in an FMCW system with a stepped frequency sweep, i.e. where each emitted sweep comprises a set of discrete frequencies, so that the generated IF signal is piecewise constant.

According to one embodiment, the processing circuitry is adapted to update the combined sample vector after each frequency sweep, by combining samples from a most recently acquired IF signal with samples of a second most recently acquired IF signal. In other words, for each sweep, an updated combined sample vector is obtained, and an updated distance measure can be determined. The IF signal from each sweep will thus be used twice; first combined with the IF signal obtained immediately before, and then combined with the IF signal obtained immediately afterwards. An advantage with this processing is that an updated measure can be obtained after each sweep, i.e. as often as in a conventional stepped FMCW.

According to one embodiment, the first set of frequencies comprises f0, f0+2Δf, f0+4Δf, ..., f0+2(N−1)Δf, and the second set of frequencies comprises f0+Δf, f0+3Δf, ..., f0+(2N−1)Δf, where Δf is a frequency step. Each set thus includes N frequencies, which each result in one constant piece of the piecewise constant IF signal.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

In the present description, embodiments of the present invention are mainly described with reference to a radar level gauge system having a free propagating antenna for radiating and capturing electromagnetic signals. It should be noted that this by no means limits the scope of the invention, which is equally applicable to other signal propagating devices, including other free propagating antennas such as a rod antenna, a patch antenna, a fixed or movable parabolic antenna or a conical antenna, and wave guides, such as a still pipe, a transmission line or a probe, such as a single-line probe (including a so-called Goubau probe), a twin-line probe or a coaxial probe.

Further, in the following description, embodiments of the present invention are mainly described with reference to an FMCW radar level gauge using a stepped frequency sweep. It is noted that the present invention is advantageous in any sampled FMCW system, also when the frequency sweep is continuous.

Figure 1:
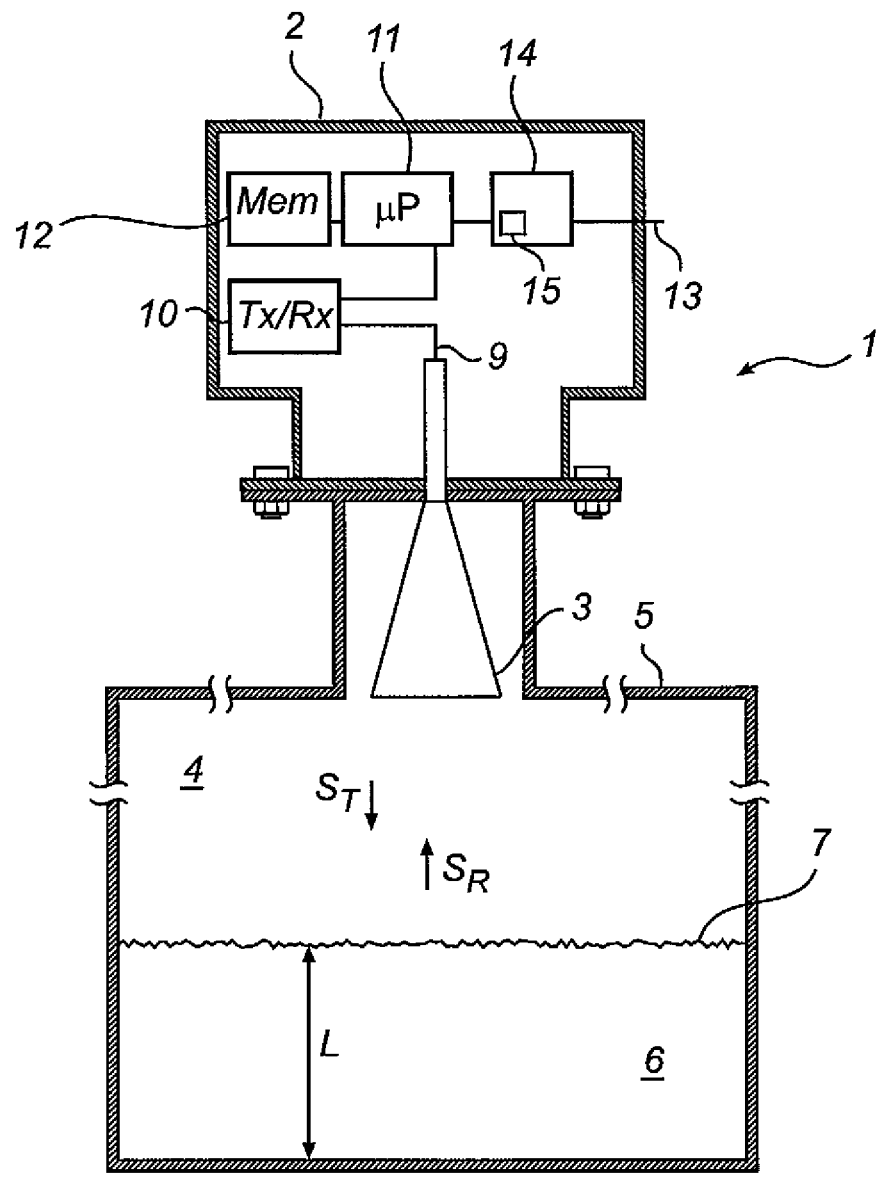
FIG. 1 is a schematic section view of a level gauge suitable for implementing the present invention.

FIG. 1 schematically illustrates a radar level gauge system 1 according to an embodiment of the present invention, comprising a measurement electronics unit 2, and a signal propagating device, here a horn antenna 3. The radar level gauge system 1 is provided on a tank 5, which is partly filled with a product 6 to be gauged. The product 6 in the tank may be a liquid, a liquid gas, or even a solid, such as grain or plastic pellets. The FMCW measurement method provides a relatively high measurement sensitivity of the radar level gauge system, enabling reliable measurement results also when interfering objects are present in the tank. By analyzing transmitted signals $S_T$ being radiated by the antenna 3 towards the surface 7 of the product 6, and echo signals $S_R$ traveling back from the surface 7, the measurement electronics unit 2 can determine the distance between a reference position and the surface 7 of the product 6, whereby the filling level L can be deduced. It should be noted that, although a tank 5 containing a single product 6 is discussed herein, the distance to any material interface present in the tank 5 can be measured in a similar manner.

As is schematically illustrated in FIG. 1, the electronics unit 2 comprises a transceiver 10 for transmitting and receiving electromagnetic signals, which here is connected to the antenna 3 via a wave guide 9. It is noted that the antenna 3 optionally may be connected directly to the transceiver circuitry, or be connected via a suitable signal medium, such as a coaxial cable, The unit 2 further comprises processing circuitry 11, which is connected to the transceiver 10 for control of the transceiver and processing of signals received by the transceiver to determine the filling level of the product 6 in the tank 5. The processing circuitry 11 is also connected to a memory 12, storing any software required for the operation of the gauge 1, and also providing RAM used during operation.

The processing circuitry 11 is further connectable to external communication lines 13 for analog and/or digital communication via an interface 14. As an example, the communication between the communication interface 14 and an external control station (not shown) can be provided by a two-wire interface, which has a combined function of both transmitting the measurement result to the control station and receiving power for operation of the gauge 1. Such a two-wire interface may provide a more or less constant power, and the measurement result can be superimposed on the power voltage using a digital protocol, such as Fieldbus Foundation or HART. Alternatively, the current in the lines is regulated in accordance with the prevailing measurement result. An example of such an interface is the 4-20 mA industrial loop, where the current is regulated between 4 and 20 mA, depending on the measurement result. Alternatively, the gauge may communicate wirelessly with the control station using e.g. a Wireless HART protocol, and use a local power supply (not shown) with batteries or other means of scavenging energy for autonomous operation.

The interface 14 includes power management circuitry, including a power store 15 for storing power during periods when the microwave unit is inactive, thereby enabling higher power consumption during periods when the microwave unit is active (i.e. during the sweep). With such power management, lower average power consumption may be achieved, while still allowing short periods of higher power consumption. The power store 15 may include a capacitance, and may be restricted by space requirements as well as intrinsic safety requirements (applying when the gauge 1 is arranged in the hazardous zone of a tank with explosive or flammable contents).

Although being shown as separate blocks in FIG. 1, several of the transceiver 10, the processing circuitry 11 and the interface 14 may be provided on the same circuit board, or even in the same circuit.

Figure 2:
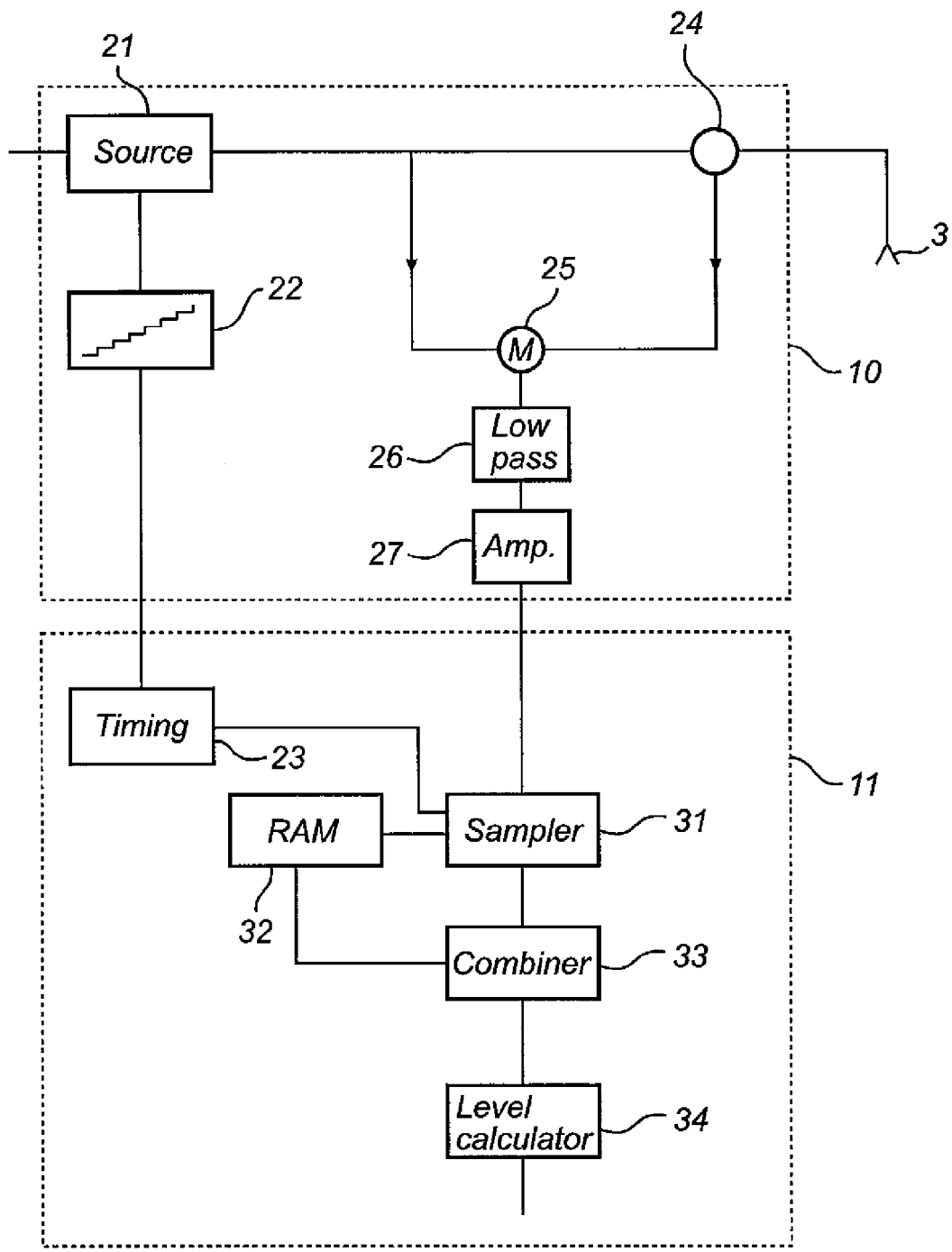
FIG. 2 is a schematic block diagram of the transceiver and processing circuitry in the gauge in FIG. 1, according to an embodiment of the present invention.

Referring now to FIG. 2, there is shown a more detailed block diagram of the transceiver 10 and processing circuitry 11 in FIG. 1 according to an embodiment of the present invention.

The transceiver 10 here includes a microwave source 21 driven by a step generator 22, in turn controlled by timing circuitry 23 forming part of the processing circuitry 11. The microwave source 21 is connected to the antenna 3 via a power divider 24. The power divider 24 is arranged to connect a return signal from the antenna to a mixer 25, which is also connected to receive the signal from the microwave source 21. The mixer output is connected to a low pass filter 26 and an amplifier 27.

The processing circuitry 11 here includes, in addition to the timing circuitry 23 mentioned above, a sampler 31 adapted to receive and sample the signal. The sampler may comprise a sample-and-hold circuit in combination with an A/D-converter, or be realized as a sigma-delta converter. The sampler 31 is controlled by the timing circuitry to be synchronized with the measurement signal. The processing circuitry further includes a memory 32 for storing a sample vector from the sampler 31, and a sample vector combiner 33 connected to the memory 32 and the sampler 31. Finally, the processing circuitry includes a level calculator block 34 connected to the combiner 33.

While the elements of the transceiver 10 are typically implemented in hardware, and form part of an integrated unit normally referred to as a microwave unit, at least some portions of the processing circuitry are typically embodied by software modules executed by an embedded processor. The invention is not restricted to this particular realization, and any implementation found suitable to realize the herein described functionality may be contemplated. During operation, the timing circuitry 23 controls the microwave source 21 to output a measurement signal in the form of a stepped frequency sweep. The measurement signal can normally be stepped from a lower frequency to a higher frequency in suitable steps. As an example, the frequency sweep may have a bandwidth in the order of a few GHz (e.g. 0.2-6 GHz), and an average frequency in the order of 25 GHz or 10 GHz. This number of steps N in the sweep may be in the range 100-4000, typically 200-2000, and may be around 1000 for a desired range of 30 m. The size of each frequency step ($\Delta f$) will thus typically be in the order of MHz. For a power limited application the duration of the sweep is limited, and is typically in the order of 0-100 ms. As an example, the duration of the sweep may be around 30 ms, and with 1000 frequency steps (N=1000), this results in a duration for each step in the order to 30 μs, or an update rate of around 30 kHz.

The measurement signal from the microwave source is emitted into the tank 5 by the antenna 3, and the echo signal is returned via the power divider 24 to the mixer 25 where it is mixed with the measurement signal. The mixed signal, referred to as an IF-signal, is filtered by the filter 26 and amplified by amplifier 27 before being supplied to the processing circuitry 11. The IF signal is a piecewise constant oscillating signal, with a frequency proportional to the distance to the reflecting surface. A typical frequency is in the order of kHz, e.g. less than 100 kHz, and typically less than 15 kHz.

The amplified IF-signal is received by the processing circuitry 11, where it is sampled and A/D-converted by the sampler 31. The sampling frequency of the A/D-converter 30 is advantageously sufficiently close to the update rate of the measurement signal, in order to sample each step of the measurement signal once and only once.

The sample vector resulting from the sampling is stored in memory 32. Next, the combiner 33 combines two or more sample vectors, acquired during consecutive sweeps. The combined sample vector is supplied to the level calculator block 34, which determines the frequency of the IF-signal based on the combined sample vector, and then determines the distance to the reflecting surface (and subsequently the filling level of the product in the tank) based on the IF-signal frequency.

FIG. 3 illustrates the various signals occurring in an exemplary embodiment of the present invention. In this case, two consecutive sweeps are combined to generate the combined sample vector.

Figure 3A:
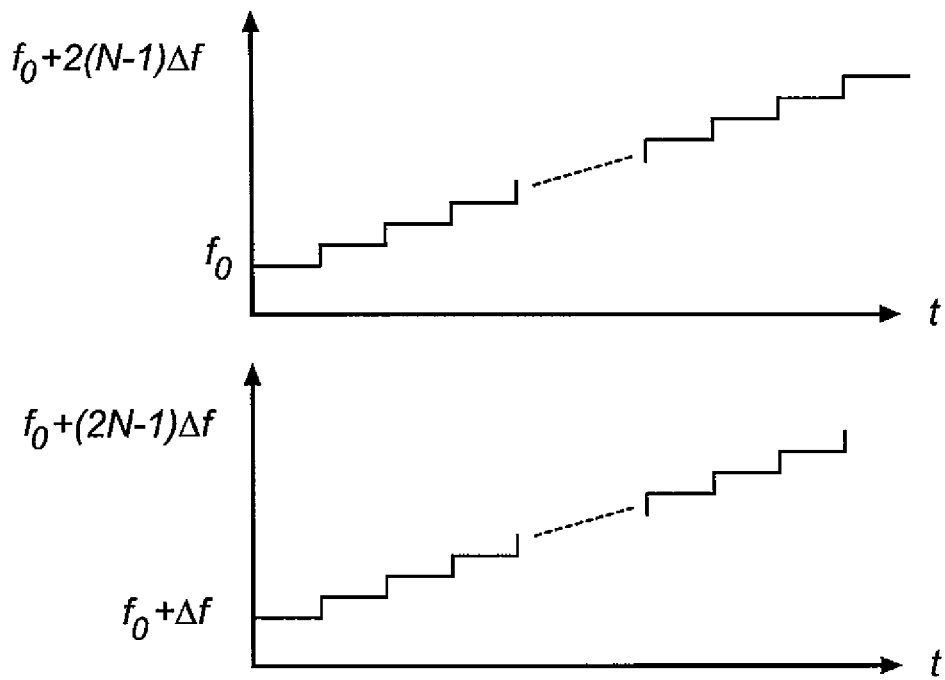
FIG. 3 show various signals occurring in the circuitry in FIG. 2.

FIG. 3*a* illustrates the measurement signals from two consecutive sweeps. The first sweep starts at a frequency f0, and includes N−1 steps of size $2\Delta f$. The second sweep starts at frequency $f0+\Delta f$, and also includes N−1 steps of size $2\Delta f$. The two sweeps are thus interleaved with each other, and a combination of the two sweeps includes 2N frequencies, providing 2N samples of the IF signal.

Figure 3B:
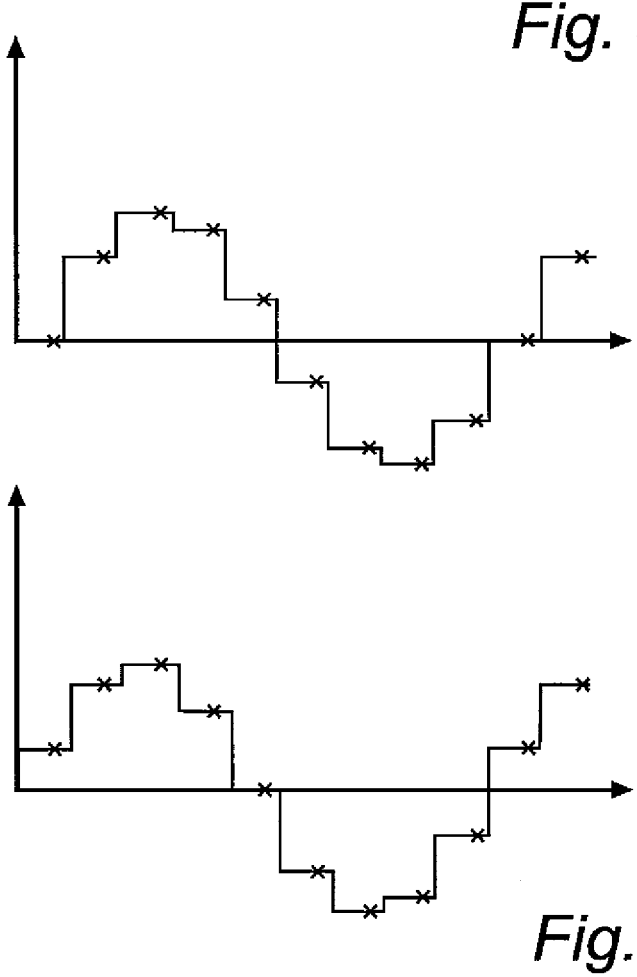

FIG. 3*b* illustrates one period of the IF-signals resulting from the two measurement signals. The IF-signals are also piecewise constant signals, and both vary periodically with a frequency proportional to the distance to the reflecting surface. Examplary sample points are marked by crosses in the signals. The sample points are typically located at the end of each constant period, in order to allow for any transient behavior to settle.

Figure 3C:
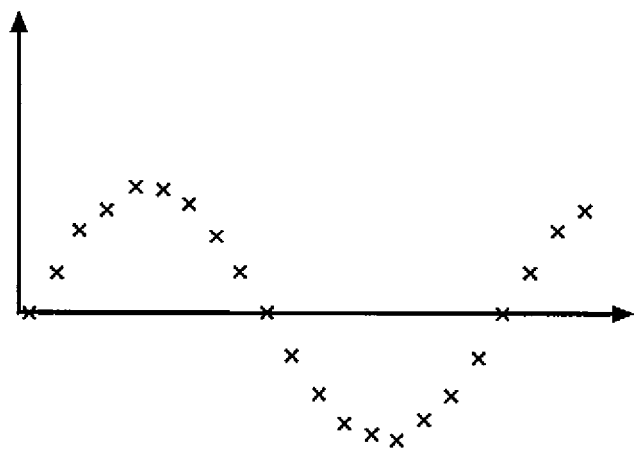

FIG. 3*c* illustrates a combined sample vector (dots), from which an IF-signal frequency can be determined. The combined sample vector includes all the samples from each of the two acquired IF signal samplings in FIG. 3*b*.

It is noted that several alternatives to the signals illustrated in FIG. 3 may be contemplated. To begin with, the number of sweeps that are combined can be greater than two. Further, the sweeps do not need to be interleaved as in FIG. 3. Another possibility is to have the first sweep start at f0 and include N steps of size $\Delta f$, and the second sweep to start at $f0+N\Delta f$ and also include N steps of size $\Delta f$. The combination of these sweeps will again result in 2N samples over the frequency range.

Figure 4:
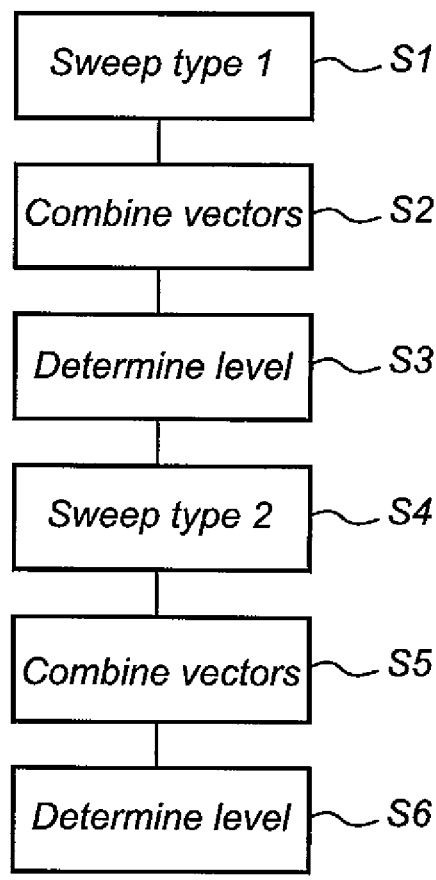
FIG. 4 is a flow chart of a method according to an embodiment of the present invention.

It is clear from FIG. 3 that by combining two sweeps, the combined sample vector has twice as many samples (improved resolution), while the bandwidth and the sweep duration has been maintained. The power store 15 may be recharged between every sweep, leading to a more efficient power management of the gauge. FIG. 4 illustrates a flow chart of how an embodiment of the present invention can be realized.

First, in step S1, a sweep of a first type (e.g. according to FIG. 3*a*) is performed, and the resulting sample vector is stored in memory. Then, in step S2, this sample vector is combined with a previously acquired sample vector (i.e. from a preceding sweep), and in step S3 a filling level is determined based on the combined sample vector.

Then, in step S4, a sweep of a second type (e.g. according to FIG. 3*b*) is performed, and the resulting sample vector is stored in memory. In step S5, this sample vector is combined with the sample vector stored in step S1, and in step S6 a filling level is determined based on the combined sample vector.

According to this method, an updated measurement value can be determined after each sweep, although it is based only partly on new information. The samples from each sweep will be used twice, first in combination with a previously acquired sample vector, and then in combination with a subsequently acquired sample vector.

Optionally, a separate filling level can be determined based only on the most recent sweep, i.e. between steps S1 and S2 and between steps S4 and S5. Such intermediate measurements may enable a verification of the measurement obtained in steps S3 and S6. Note that such measurements will be based only on half the number of samples, and will only be reliable if the number of samples is sufficiently high in relation to the frequency of the IF signal, which as mentioned is proportional to the detected distance. In a situation where the number of samples in the combined vector is adapted to a given range L, intermediate measurements will be reliable for detected distances shorter than L/2.

The person skilled in the art realizes that the present invention by no means is limited to the preferred embodiments described above. On the contrary, many modifications and variations are possible within the scope of the appended claims. For example, the number of sweeps that are combined may be greater than two. Further, the division of a complete sweep between two or more sweeps is not limited to the examples given above, but more complex interleaving may be advantageous.

What is claimed is:

1. A level gauge using microwaves to determine a distance to a surface of a product in a tank, comprising:
   a microwave source arranged to generate a measurement signal, comprising a first frequency sweep, and a second frequency sweep,
   a signal propagation device, connected to the microwave source and adapted to allow propagation of the measurement signal into the tank, and to receive an echo signal reflected from said surface,
   a power store to power the microwave source, said power store being charged between sweeps,
   a mixer connected to said microwave source and said signal propagation device, and arranged to mix said measurement signal with said echo signal to form a first IF signal based on said first frequency sweep, and a second IF signal based on said second frequency sweep,
   processing circuitry, connected to receive said IF signals from said mixer and adapted to sample said first IF signal and said second IF signal, to form a combined sample vector including samples from each IF signal, and to determine said distance based on said combined sample vector.

2. The level gauge according to claim 1, wherein each frequency sweep includes a set of discrete frequencies, whereby each IF signal is piecewise constant.

3. The level gauge according to claim 1, wherein said measurement signal comprises a third frequency sweep.

4. The level gauge according to claim 1, wherein said processing circuitry is adapted to update said combined sample vector after each frequency sweep, by combining samples from a most recently acquired IF signal with samples of a second most recently acquired IF signal.

5. The level gauge according to claim 1, wherein said processing circuitry comprises sampling circuitry including one of a sample-and-hold circuit and a sigma delta converter.

6. The level gauge according to claim 1, wherein said first set of frequencies comprises $f0, f0+2\Delta f, f0+4\Delta f, \ldots, f0+2(N-1)\Delta f$, and said second set of frequencies comprises $f0+\Delta f, f0+3\Delta f, \ldots, f0+(2N-1)\Delta f$.

7. The level gauge according to claim 1, wherein each frequency sweep has a bandwidth in the range 0.2-3 GHz.

8. The level gauge according to claim 1, wherein the IF-signal has a frequency in the range 0-15 kHz.

9. The level gauge according to claim 1, wherein each frequency sweep has a duration in the range 0-100 ms.

10. The level gauge according to claim 2, wherein the number N of frequencies in each set is in the range 100-2000.

11. The level gauge according to claim 2, wherein the difference between two adjacent frequencies in a set is in the order of MHz.

12. A method for determining a distance to a surface of a product in a tank, comprising the steps of:
    generating a measurement signal, comprising a first frequency sweep and a second frequency sweep,
    emitting the measurement signal into the tank,
    receiving an echo signal reflected from said surface,
    mixing the measurement signal with said echo signal to form a first IF signal based on said first frequency sweep, and a second IF signal based on said second frequency sweep,
    sampling said first IF signal and said second IF signal,
    forming a combined sample vector including samples from said first and second IF signals, and
    determining said distance based on said combined sample vector.

13. The method according to claim 12, further comprising:
    alternatingly emitting said first and second sweeps,
    alternatingly acquiring said first and second IF-signals based on said first and second sweeps,
    forming a combined sample vector after each sweep, said combined sample vector comprising samples from two most recently formed IF-signals.

14. The method according to claim 12, wherein each frequency sweep includes a set of discrete frequencies, and wherein each IF signal is piecewise constant.

15. The method according to claim 12, wherein said measurement signal comprises a third frequency sweep.

16. The method according to claim 12, wherein said first set of frequencies comprises $f0, f0+2\Delta f, f0+4\Delta f, \ldots, f0+2(N-1)\Delta f$, and said second set of frequencies comprises $f0+\Delta f, f0+3\Delta f, \ldots, f0+(2N-1)\Delta f$.

17. The method according to claim 12, wherein each frequency sweep has a bandwidth in the range 0.3-6 GHz.

18. The method according to claim 12, wherein the IF-signal has a frequency in the range 0-15 kHz.

19. The method according to claim 12, wherein each frequency sweep has a duration in the range 0-100 ms.

20. The method according to claim 12, wherein the number N of frequencies in each set is in the range 100-2000.

21. The method according to claim 12, wherein the difference between two adjacent frequencies in a set is in the order of MHz.

22. The method according to claim 13, further comprising determining said distance also based only on one of said first IF signal and said second IF signal.

* * * * *